3,329,737
CURABLE COMPOSITION CONTAINING A POLY-EPOXIDE AND AN ALLYLIC POLYPHENOLIC NOVOLAC, FREE OF METHYLOL GROUPS
Carl M. Smith, White Bear Lake, Minn., assignor to Minnesota Mining and Manufacturing Company, St. Paul, Minn., a corporation of Delaware
No Drawing. Filed Mar. 9, 1964, Ser. No. 350,551
9 Claims. (Cl. 260—831)

This invention relates to curing agents for epoxy resins, to latent-curing epoxy resin compositions and particularly to fluid compositions having latency of cure and extended pot life at elevated temperatures.

The field of epoxy resins is one in which a great deal of effort has been expended in producing new and novel curing agents and curable compositions. In general the curable compositions consist essentially of a prepolymer which is a polyglycidyl ether of a polyphenol and a curing agent which possesses a plurality of active hydrogen atoms such as polyamines, anhydrides or other polyfunctional compounds. Most such compositions commence curing almost as soon as the components are mixed and many are rapidly gelled at temperatures only very slightly above ambient temperatures. In the gelled condition polymers are no longer tractable. for example, in impregnation, encapsulation and the like operations. Because many valuable epoxy prepolymers are not appreciably fluid at ordinary conditions, the ease with which gelation occurs precludes their use for many purposes where fluidity is necessary. Latent curing agents are known which are substantially insoluble in the prepolymers until moderately elevated temperatures are reached. These curing agents may have some tendency to separation if the viscosity of the compositions comprising them drops too low as a result either of warming or dilution with more fluid prepolymers. Such compositions may even exhibit some separation on prolonged standing. There is accordingly a need for curing agents which are compatible with epoxy prepolymers under normal conditions and have good curing latency under conditions of sufficiently elevated temperature to achieve a reasonable degree of fluidity but which react with epoxy prepolymers under other predetermined conditions to give strong cured resins. Such compositions should desirably further have low volatility to avoid tendencies toward bubble formation.

It is an object of this invention to provide curable compositions exhibiting substantially no volatility comprising epoxy resins in combination with curing agents therefore.

A further object of this invention is to provide compositions of epoxy resins and curing agents therefore which do not undergo reaction at an appreciable rate at temperatures below about 150° C.

A yet further object of this invention is to provide cured epoxy resins having good strength.

Another object of this invention is to provide agents for the controlled curing of epoxy resin prepolymers.

Yet other objects will become evident from the following disclosure.

In accordance with the above and other objects of the invention it has been found that allyl substituted polyphenol novolaks are valuable compatible latent curing agents for epoxy resin prepolymers.

In one embodiment of the invention it is found that allylic ethers of certain polyphenols having at least one hydrogen in ortho or para relation to each phenolic OH group and having at least three phenolic OH groups are fully compatible with epoxy resin prepolymers and may be combined therewith in substantially any proportion. When so combined in proportions such that there is substantially one-to-one or stoichiometric equivalence of allylic ether and epoxy groups and the compositions heated to temperatures in the range of about 180° to about 220° C. for from about ½ to about 16 hours, rearrangement of the allylic group to ring positions is brought about. The epoxy groups then react substantially quantitatively with the phenolic groups liberated by the rearrangement and thermal cross-linking of allyl groups occurs to produce cured epoxy resins having excellent mechanical and electrical properties for reinforced plastics.

Illustrative of this embodiment are a latent curing resin composition consisting essentially of substantially stoichiometric equivalents, based on allyl and glycidyl ether groups, respectively, of a polyallyl ether of a novolak, free from methylol groups, of a monohydric phenol, substituted in the ortho and para positions by hydrogen and substituted in the meta position by a member selected from the group consisting of hydrogen, alkyl and alkoxy; and polyglycidyl ether of polyphenol and such compositions derived from novolaks of polyphenols such as 2,2-bis(4'-hydroxyphenyl)-propane.

The compositions of this embodiment are indefinitely latent temperatures below about 120° C. in the absence of catalysts for the homopolymerization of the epoxy resin components. The compositions of this embodiment of the invention have a further advantage in that they can be partially reacted, i.e. "B-staged," to a desired working viscosity and then quenched by cooling so that further reaction is prevented. The B-staged composition has substantially indefinite latency at ambient temperatures and can be further cured, when desired, by resumption of heating.

In another embodiment of the invention it is found that the same allylic ethers can be rearranged in the absence of epoxy resin prepolymer at temperatures in the range of 180° to about 220° C. and can then be blended compatibly with the epoxy resin prepolymer in suitable proportions to give compositions suitable for massive castings. In the absence of catalysts, the compositions of this embodiment of the invention possess a desirable degree of latency at elevated temperatures of the order of about 100° C. and readily advance in cure at temperatures up to about 150° C. to give shape-retaining castings or moldings which further rigidify at least partially by thermal cross-linking of allyl groups in subsequent curing at temperatures in the range of about 180° C. to 220° C. as above. Compositions of this embodiment provide the advantage of freeing molds or forms for further casting operations after the initial rigid shape is realized, as further cure can take place out of the mold; and also avoid the detrimental consequences of effecting a highly exothermic rearrangement reaction in a mass of resin at such high temperatures.

It has also been found as a further embodiment of the invention that C-allylic polyphenols useful as latent curing agents may be obtained by preparing novolaks from allylated bisphenols. Compositions of this embodiment offer the advantages attained using pre-arranged allylic polyphenol novolaks with the additional attainment of somewhat greater rigidity from post cures at temperatures in the range of about 150° to 180° C.

The invention thus broadly contemplates latently curable combinations, in substantially stoichiometrically reactive proportion, of glycidyl compounds, i.e., polyepoxides, having more than one oxirane group per molecule and allylic polyhenolic novolaks where the term allylic polyphenolic novolaks will be understood to include both etherified and annularly substituted allylic groups, for example, O-allyl and C-allyl groups.

The term allylic ether is used herein to refer to ethers of alkenyl radicals which are members of the group consisting of allyl, crotyl, alpha-methallyl and beta-methallyl radicals or stated differently, members of the group consisting of allyl radicals and monomethylallyl radicals. The allyl ethers are preferred because they are more readily prepared. No particular advantage is found in the use of the homologs of the preferred allyl ethers which, although generally to be considered equivalents, are less readily prepared.

The polyphenols of which the allylic ethers are employed in certain compositions of the invention are novolaks of bis phenols. It will be understood that the term "novolak" as herein employed refers to condensation products having methylene groups linking benzenoid rings and substantially free from methylol groups.

Compositions of the invention are prepared using a novolak of bisphenol of the formula:

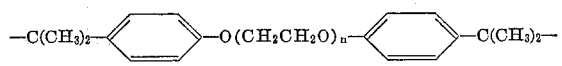

wherein Z is a divalent linking group selected from the group consisting of

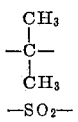

—SO$_2$— and

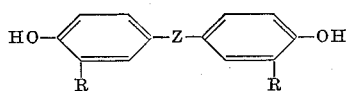

wherein $n$ is an averaged number from 1 to 13 and each R is a member of the group consisting of hydrogen and allyl.

The novolak polyphenols are prepared from the appropriate bisphenol using formaldehyde and strong acid catalyst. The molar ratio of phenolic compound to formaldehyde is not dependent on the number of phenolic groups present but must be within certain limits to provide polyphenols having sufficiently high functionality and yet not so great as to form crosslinked, gelled resins. These proportions are found to be 0.7±0.2 mole of formaldehyde per mole of bisphenolic compound. It will be evident that slight deviation outside these ranges may occur without resulting in inoperative materials and accordingly the novolaks may be described generically as being formed from about 0.5 to about 0.9 mole of formaldehyde per mole of phenolic compound.

Allylic ethers of novolak polyphenols are prepared by reaction of the polyphenol with the allylic chloride in the presence of a strong base, e.g., sodium hydroxide. It is a surprising feature of the instant process for the preparation of allylic ethers that, in the heterogeneous systems employed, there is relatively little substitution of allyl groups in the benzenoid rings. The reaction of bisphenol A with formaldehyde followed by formation of the allyl ether is exemplary of the preparation of the allylic ethers of novolak polyphenols employed in compositions of the invention:

I.
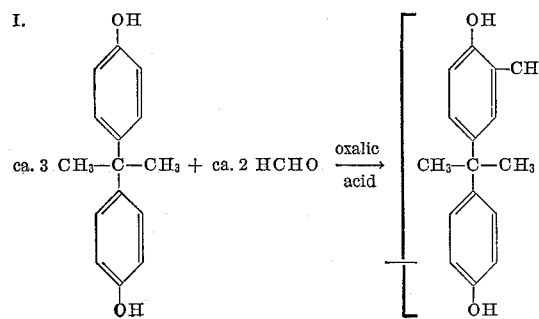

II.
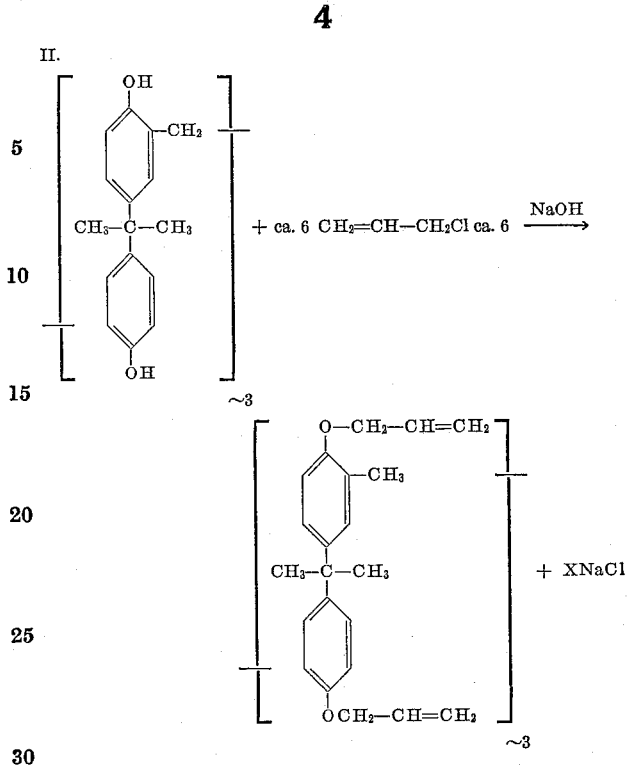

It will be understood that the subscript number on the brackets is an average value and in specific instances novolaks of varying degrees of complexity are obtained and that terminal units will usually possess the linking methylene group only in conjunction with the penultimate unit inasmuch as the novolaks are substantially free from terminal methylol groups.

Assuming the average complexity of the novolak of 3, the structure of the product of Equation II is then expanded to:

III.
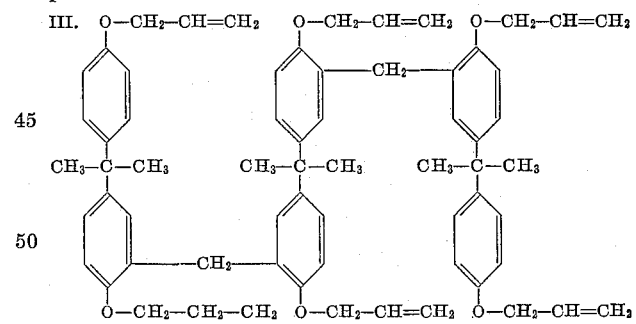

and

IV.
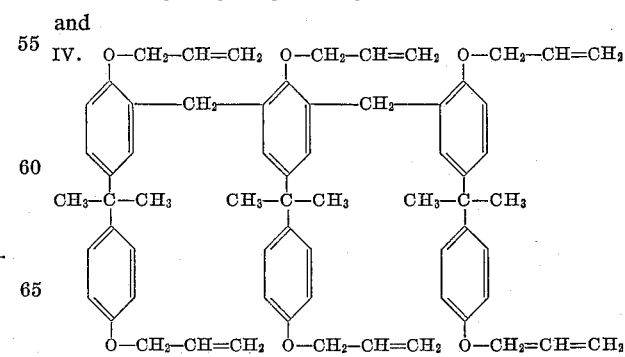

It will be understood that the two structures are equivalent for the purposes of the invention and that they are formed in the same reactions and the relative amounts are largely undeterminable.

Those skilled in the art will readily understand that other such allylic ethers of novolak polyphenols having four and more bisphenol units employed in the compositions of the invention will have similar structures which may be more complicated and impractical to present in structural formulae although fully capable of such presentation by one skilled in the art from the present disclosure. Formulae III and IV are thus to be understood as simple exemplary structures of these components of the compositions of the invention.

These allylic ethers may be rearranged to allyl-substituted polyphenols by heating alone to temperatures in the range of about 180° to 220° C. The resultant annularly allyl-substituted polyphenols, i.e. C-allyl or ring-substituted polyphenols, and similar compounds prepared by the forming novolaks of annularly allyl-substituted bisphenols are valuable as highly substituted phenols because they are liquids in contrast to prior art polyphenols of comparable molecular weights and because they have a very gradual rate of reaction with epoxy resin prepolymers at temperatures which are above the temperatures at which prior art phenols react with epoxy resin prepolymers. The allyl-substituted polyphenols may also be converted to valuable derivatives such as the glycidyl ethers and hence are useful intermediates.

Certain embodiments of the invention contemplate the blending of the annularly allyl-substituted polyphenols with epoxy resin prepolymers. These blends are curable by heating.

As stated above, compositions of another embodiment of the invention comprise allylic ethers of novolak polyphenols and epoxy resin prepolymers.

The term "epoxy resin prepolymer" is herein used to refer collectively to curable oxirane-group containing compounds and polymers, mixtures of such materials and the like. More particularly reference is had to glycidyl ethers of bisphenol A such as the commercially available epoxy resins available under various trade names. Curability of these prepolymers appears to depend on the presence of an average content of more than one oxirane group per molecule. It is well known that useful compositions may be produced by subjecting epoxy resin prepolymers to the action of curing agents. An extensive series of such prepolymers and curing agents are known. Some typical examples of such prepolymers, which are often designated in the art simply as epoxy resins, are the glycidyl ethers of bisphenol-A. Other typical epoxy resins are described in the annual Encyclopedia Issue of Modern Plastics. In general, epoxy resin prepolymers have very low volatility. The preferred class for compositions of the invention is those epoxy resin prepolymers having substantial stability and no appreciable volatility at temperatures of about 200° C. A still more preferred class are the glycidyl ethers of unsubstituted novolak polyphenols and other epoxy resin prepolymers having both low volatility and high functionality.

The compositions of one embodiment of the invention are prepared by blending the desired allylic ethers and epoxy resin prepolymers in proportions such that there is substantial equivalence between the number of functioning allylic ether and glycidyl groups. The functioning allylic ether groups are those groups located so as to have available ortho and/or para positions to which rearrangement of the allyl group is possible. It is found that about 60–70 percent of the total allyl groups present can be so rearranged. The functioning allyl ether groups, i.e. those that can be rearranged, are determined by the phenol equivalence of the material. A sample is heated under nitrogen for 20 minutes at about 210° to 215° C. and the phenolic groups liberated by rearrangement are determined by non-aqueous titration with tetrabutyl ammonium hydroxide. Blends of the allylic ether component and epoxy prepolymer component are made employing substantially stoichiometric amounts based on phenol equivalence and epoxy equivalence. The non-functioning allylic ether groups, i.e. non-rearrangeable allylic groups, are at least partially available for vinyl type polymerization among allylic groups. After curing involving the epoxy groups has occurred, further post-curing occurs with these compositions of the invention either at more elevated temperatures or concomitantly with the curing of epoxy groups. Post-curing appears to be the result of polymerization of allylic groups providing effective reinforcement of the polymer structure observed as increased rigidity at elevated temperatures.

The compositions of the above embodiment of the invention are novel in that curing is initiated by rearrangement of one component to provide available phenolic groups. Liberation of the phenolic groups is effected at temperatures of rearrangement, viz. 180° to 230° C., which are sufficient to assure that reaction of the liberated phenolic groups with oxirane groups commences almost simultaneously and the two reactions of rearrangement and cross-linking thus occur concurrently during at least a part of the curing time. Additionally cross-linking, i.e. post-curing, occurs by thermal polymerization through allyl groups. In general periods of 1 hour at temperatures of 220° C. are sufficient to effect substantially complete curing of the composition to hard, tough, insoluble epoxy resins of exceptional strength and heat stability.

In other embodiments of the invention, post curing at elevated temperatures is effected separately from the initial epoxy curing reaction to provide the enhanced resistance to thermal degradation attainable. The employment of high temperatures for simultaneously rearranging and curing blends of epoxy resin prepolymer and allylic ether of polyphenol novolak is disadvantageous when massive structures are cast or formed because the rearrangement reaction is itself exothermic and massive structures may become excessively hot. In these compositions the allylic ethers are first rearranged at sufficiently high temperatures to C-allylic polyphenol novolaks or novolaks of C-allyl substituted bisphenols are prepared either of which are thereafter blended in suitably stoichiometric proportions with the desired epoxy resins. These compositions are initially cured to shape retaining articles at relatively lower temperatures for longer times in conventional equipment which may not be designed to operate at the higher temperatures necessary for simultaneous rearrangement and cure. Subsequent post curing may be effected as desired, for example, in an oven after removal from the forms.

The embodiment of the invention in which the C-allylic novolaks are prepared by employing allyl-substituted bisphenols for the preparation of the novolaks offers the advantage that rather closer predetermined equivalence of phenolic and oxirane groups is possible than when C-allylation is effected by rearrangement of O-allyl ethers. The C-allylic novolaks prepared by this method are free from allylic ether groups.

Having described my invention in broad terms it is now more specifically illustrated by examples showing the best mode presently contemplated of practicing the invention. In these examples, where not otherwise indicated, parts of solids are by weight and of liquids by volume, percentages are percents by weight and temperatures are in degrees centigrade.

Example 1

This example illustrates the preparation of the allyl ether of a bisphenol-A novolak for use in compositions of the invention.

In a vessel provided with a removable heating jacket and fitted with mechanical stirrer and two reflux condensers and with a port for insertion of a thermometer are charged 914 parts of bisphenol-A (so called polycarbonate grade), 84 parts of paraformaldehyde and 40 parts of oxalic acid ground to below 40 mesh size. The dry charge is commingled insofar as practical and 200 parts of toluene are added. Heating is commenced and, as soon as sufficient liquefaction has occurred, a thermometer is inserted into the charge and mechanical agitation is started. Heating is continued until an exothermic reaction commences (temperature 89° C.) at which time the heating jacket is shut down and removed until the reaction subsides. The jacket is restored to position and heating is continued for about one hour. Then, 360 parts of sodium hydroxide pellets and, after about 1 to 2 minutes of vigorous stirring, 1000 parts of n-butanol are added. Stirring is continued for about 1 hour during which time refluxing is maintained by the heat of reaction of the sodium hydroxide with the novolak bisphenol and oxalic acid. A dropping funnel (pressure equalized) is attached and 640 parts of allyl chloride are then added to the stirred reaction mixture during 2.5 hours. Initial temperature for this addition is raised to 76° C., if necessary, by means of the heating jacket. The viscous reaction mixture becomes more fluid during the addition. Heating and stirring are maintained until the temperature of the refluxing reaction mixture remains constant for 3 hours at about 91–93° C.

The reaction mixture is cooled to room temperature and 500 parts each of toluene and water are added. After thorough agitation, stirring is stopped and the lower aqueous phase separated. A further 500 parts each of toluene and water are added together with about 10 parts of 6 N hydrochloric acid (to aid in separation of phases) and after agitation the aqueous phase including suspended salts is removed. The addition of toluene and water is repeated with separation of the aqueous phase and one further wash of the toluene phase with a further 250 parts of water. The clear organic phase is separated and stripped of solvents at 120° C. to yield the clear, golden yellow polyallyl ether of bisphenol A-novolak in substantially quantitative yield.

Most of the phenolic groups of the novolak are allylated by this procedure with some annular substitution of allyl groups occurring simultaneously. Such annular substitution is undesirable in allyl ethers for use in compositions of the invention because it blocks positions to which allylic ether groups can rearrange. It is known that such annular substitution is a very considerable side reaction when allylation is effected under heterogeneous conditions (see Korublum and Lurie, J. Am. Chem. Soc., vol. 81, page 2705 (1959)). That this annular substitution can be reduced in extent to give the valuable allylic ethers of the invention would not be expected from the teachings of the prior art. From estimations of the increase in weight due to formation of the allylic ethers and of the free hydroxyl groups it is possible to estimate the extent to which allylic groups have been introduced in annular positions.

The material is assayed for free hydroxyl groups by first converting these groups to glycidyl ethers by reaction with a large excess of epichlorohydrin and sodium hydroxide followed by filtration and distillation of excess epichlorhydrin. Weighed samples of the residue are reacted with aliquots of hydrogen chloride in pyridine sufficient to give an excess of hydrogen chloride over that needed to react with oxirane groups and back titrated with standard sodium hydroxide solution. The average equivalent weight of the above material is thus found to be about 1270. In various preparations the average number of bisphenol units per molecule of novolak varies from about 3 to about 5.

It is found that in general on the basis of the weight yield there appears to be reaction of substantially one allylic group for each phenolic group of the novolak. The absence of any large fraction of free hydroxyl groups as determined by glycidyl ether formation and titration as above therefore indicates a nearly corresponding prevalence of allylic ether formation. For use in compositions of the invention it is desired that the ratio of allyl ether groups to annular allyl groups be at least 9 to 1, that is that at least about nine of ten phenolic groups be converted to allylic ethers. Such allylic ethers when converted to the glycidyl ethers as described above have equivalent weights per epoxy group of about 1200 or more.

Allylic novolak ethers of the invention are usefully employed, furthermore, in an embodiment of the invention in which the allyl groups are rearranged into the rings so that about two-thirds of the phenolic groups are reactive and free. The resultant C-allylic polyphenol novolaks are of value for the curing of epoxy resin prepolymers in certain embodiments of the invention.

*Example 2*

The allylated bisphenol-A novolak of Example 1 is prepared on a larger scale as follows:

The novolak is prepared from 32.2 pounds of bisphenol-A, 3.0 pounds of paraformaldehyde, and 1.1 pounds of oxalic acid using 6.1 pounds of toluene as a flux or fluidizer by heating in a kettle at 195° F. for 2 hours. To the charge are added 12.7 pounds of sodium hydroxide pellets and 28.6 pounds of n-butanol and the mixture is stirred for 1 hour to form the sodium salts and then, at a pot temperature of 175° F., 22.6 pounds of allyl chloride are added over a 4 hour period. The pot temperature is raised to 200° F. during 3 hours and held for a further 3 hours. The charge is diluted with 30 pounds of toluene and filtered to remove precipitated sodium chloride. The filtrate is acidified to pH 6 with hydrochloric acid and washed three times with 40 pounds each time of water. The organic layer is then stripped (nitrogen atmosphere) under reduced pressure to a temperature of 240° F. The product allyl ether of bisphenol-A novolak is essentially similar to that obtained in Example 1. It is found to contain an average of about 1.76 allyl ether groups per bisphenol unit together with about 0.16 annular allyl group (e.g. 0.08 annular allyl group per phenolic group).

This may be employed in combination with oxirane prepolymers directly, in which case the blend is labilized by curing at temperatures of 180° to 230° C. for about ½ to 16 hours, or the rearrangement may be effected before blending by heating to similar temperatures for similar times and thereafter blending with suitable proportions of oxirane prepolymer.

*Example 3*

The allyl ether of 4,4'-dihydroxydiphenyl sulfone novolak is prepared as follows:

A vessel fitted with stirrer, thermometer extending into the charge, reflux condenser and with port for insertion of addition tube is charged with 500 parts of 4,4'-dihydroxydiphenyl sulfone (technical grade), 54 parts of paraformaldehyde, 60 parts of p-toluenesulfonic acid monohydrate and 200 parts by volume of n-butanol. The mixture is heated with stirring. The pot temperature is 105° C. when refluxing commences, rises in five minutes to 115° C. and then drops to 110° C. in 30 minutes and remains there during a further two hours when heating is discontinued. The charge which is now rather viscous is diluted and cooled by the addition through the condenser of 250 parts by volume of n-butanol and 20 parts of water. The addition tube (pressure equalized) is inserted and in it are placed 380 parts by weight of 50% by weight aqueous sodium hydroxide solution which is then added to the vessel over 80 minutes while the charge is stirring. No external heating is necessary. The charge becomes progressively more viscous and difficult to stir. The pot temperature is adjusted to about 67° C. and 325 parts by weight of allyl chloride (a slight excess over theoretical) are added gradually without external heating. Addition is continued during 190 minutes with external heating toward the end of the addition to maintain gentle reflux. Heating is continued after addition is complete and during 8 hours the temperature of the charge gradually rises to about 93.5° C. which remains constant for one hour and heating is then stopped. The viscosity of the charge is found to be much reduced and a well agglomerated crystalline deposit of sodium chloride is present. The charge is steam distilled to remove volatile organic materials and the resinous product which is rather fluid at 90° to 100° C. is separated from the briney mother liquor, neutralized with dilute hydrochloric acid and washed with steaming water six times. The product is steamed to liquefy it and poured into ice and water. The chilled product is pulverized by beating in water in a Waring Blendor, collected, air dried and finally dehydrated fully and melted in a rotary evaporator under reduced pressure at about 145° to 150° C. The product is a dark brown transparent resin containing more than about 9 allyl ether groups per annular allyl group. This compound is rearranged to the C-allyl compound by heating to about 180° C. for 6 hours.

*Example 4*

The novolak of the polyphenolic bisphenol A bisether of a polyethylene glycol ether having a molecular weight of about 300 is prepared by the procedure described hereinbelow. The structure of the bisether is believed to be:

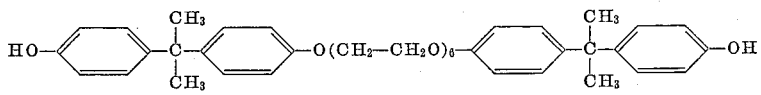

where the subscript 6 is an approximate averaged number. It is obtained by reaction of the glycol bis-benzenesulfonate with the monosodium salt of the bisphenol as described and claimed in my copending application S.N. 20,570, filed of even date herewith.

In a vessel provided with stirrer, thermometer; dropping funnel and water trap (e.g., a Dean-Stark tube) are placed 448.5 parts of the above polyphenolic bisether, 17.9 parts of oxalic acid and 500 parts by volume of n-butanol. The mixture is heated to 87° C. and 38.9 parts by weight of 37% aqueous formaldehyde are added during 5 minutes. The mixture is then refluxed for 7 hours (final pot temperature 112° C.) at which time no further water is being collected and then evaporated to constant weight first by simple distillation and then under a pressure of 1 mm. Hg.

A vessel fitted as above is charged with 150 parts of the above novolak, 200 parts by volume of n-butanol, 100 parts by weight of allyl chloride and 100 parts of anhydrous potassium carbonate and the mixture heated at reflux with stirring, while collecting water in the trap, for about 14 hours (pot temperature remains about 84° C. during last 3 hours). The reaction mixture is cooled and filtered and the filtrate stripped at 85° C. and 2 mm. Hg pressure. Further salt crystallizes from the moderately viscous light-colored allyl ether on standing. Hot filtration slowly gives a clear transparent allyl ether which is found by assay to retain about 1.5% by weight of water and to contain an average of about 2 allyl ether groups per unit plus somewhat under 0.2 annular allyl groups per phenolic group.

A substantially similar product is obtained by effecting the two consecutive reactions without isolation of the intermediate novolak as described in Examples 1 to 3 above.

When the above procedures are repeated employing comparable molar proportions of bisphenol ethers of polyethylene glycols having from 1 to 13 ethyleneoxy groups similar viscous allylic ether resinous products to the above are obtained. These ethers are useful in compositions of the invention. All of the above O-allyl ethers are converted to the C-allyl compounds by heating and the resultant compositions may then be blended directly with epoxy resin prepolymers in desired proportions to provide compositions of the invention.

*Example 5*

This example illustrates the preparation of a novolak from 2,2'-diallyl bisphenol A.

A mixture of 2000 parts (12.0 equivalents) of 2,2'-diallyl bisphenol A, 130 parts (4.34 moles) of paraformaldehyde, 62.7 parts of anhydrous oxalic acid and 627 parts by volume of toluene is heated with stirring to 70° C. in 20 minutes at which temperature an exothermic reaction commences. Heating is discontinued and in 20 minutes further the temperature rises to 93° C. and then commences to drop. Heating is resumed and the mixture is refluxed at about 98°–99° C. for 5 hours and then allowed to cool to 80° C. The oxalic acid is neutralized by adding 800 parts by volume of water and 130 parts of sodium bicarbonate while stirring the mixture vigorously. Water and toluene are then removed by distillation to 120° C. at 5 mm. Hg pressure. After cooling the crude novolak resin is taken up in acetone, filtered to remove salts and brought to a residue of brown viscous novolak resin at 120° C. at 1 mm. Hg pressure. The C-allyl-substituted novolak resin has hydroxyl equivalent by acetylation of 165, number average molecular weight (in acetone) of 691 and a functionality of 4.2.

*Example 6*

This example shows the properties attainable employing compositions of the invention. Several compositions of the invention and a comparison composition designated by capital letters hereinafter are prepared as follows.

A. A comparison composition is prepared from 60 parts of the glycidyl ether of a phenol novolak available commercially under the designation DEN438 from Dow Chemical Company (molecular weight of about 600 and an average 3.3 phenol groups per molecule connected by methylene groups in a novolak and each phenolic hydroxyl etherified by a glycidyl group) and 25.2 parts of methyl nadic anhydride (methyl endomethylene tetrahydrophthalic anhydride). This composition tends to cure slowly temperatures and approximately doubles in viscosity during 1–2 weeks.

B. A composition of the invention consisting of 41.8 parts of epoxy resin propolymer (commercially available under the designation ERL 2774 from Bakelite Company having oxirane content of 8.4% and 35.2 parts of a bisphenol A novolak allylic ether prepared as set forth in Examples 1 and 2 and containing an average of 1.75 allyl ether groups and 0.16 annular allyl groups per bisphenol A unit.

C. A composition of the invention consisting of 61.2 parts of the glycidyl ether of a bisphenol A novolak (prepared by the procedure of Example 1 except that epichlorhydrin is employed instead of allyl chloride in making the ether) and 48.0 parts of bisphenol A novolak allyl ether as used in composition B above.

D. A composition of the invention consisting of 40.1 parts of phenol novolak glycidyl ether (commercially available, as used in composition A above) and 35.2 parts of the bisphenol A novolak allyl ether as used in composition B above.

E. A composition of the invention consisting of 56.4 parts of the commercially available phenol novolak glycidyl ether of composition A above, 48.0 parts of bisphenol A novolak allyl ether as used in composition B above and 5.0 parts of allyl ether of the bis(bisphenol A) ether of polyethylene glycol of Example 4 above.

F. A composition of the invention consisting of 36.0 parts of phenol novolak glycidyl ether as used in composition A above, 23.0 parts of polyallyl ether of bisphenol A novolak (as described in Example 1 above) and 27.0 parts of the dihydroxy diphenyl sulfone novolak allyl ether of Example 3 above (not rearranged) is prepared by melting the components together.

G. A composition of the invention consisting of 180 parts of phenol novolak glycidyl ether as used in composition A above and 230 parts of rearranged bisphenol A novolak allyl ether of Examples 1 and 2 above (rearranged by first heating for 6 hours at 180° C.) having an equivalent weight of 230. This rearranged allyl ether is also herein elsewhere embraced by the designation of allylic-substituted polyphenols. This composition contains 100 percent of the stoichiometric amount of the allylic-substituted polyphenol. Other compositions of the invention are prepared to contain 80 percent and 120 percent of the stoichiometric amount of the allylic substituted polyphenol and are designated as $G_1$ and $G_2$ respectively.

The above compositions of the invention B, C, D, E, F, G, $G_1$ and $G_2$ are found to be substantially indefinitely latent at ambient temperatures and to have prolonged pot-lives at temperatures below about 120° C.

Test specimens in duplicate are prepared from samples of compositions A, B, C, D and E for the determination of mechanical properties according to ASTM test D790–61. Test specimens of A are cured for 3 hours at 250° F. followed by one hour at each of 300°, 350° and 400° F. Test specimens of compositions B, C, D and E are cured for 3 hours at 450° F. Specimens are tested in flexure according to the above test method after curing and duplicate specimens are tested after further aging for 100 hours at 500° F. (260° C.). Flexural moduli of rupture and elasticity are calculated to be as shown in Table 1.

TABLE 1

| Composition | Flexural Modulus of Rupture | | Flexural Modulus of Elasticity | |
|---|---|---|---|---|
| | Unaged | Aged | Unaged | Aged |
| A | 7,860 | 17,400 | 145,000 | 422,000 |
| B | 13,100 | 10,300 | 325,000 | 291,000 |
| C | 12,800 | 14,200 | 322,000 | 360,000 |
| D | 10,700 | 18,200 | 315,000 | 376,000 |
| E | 16,500 | 19,000 | 368,000 | 360,000 |

Ageing characteristics of composition F above are determined on test specimens prepared as hereinabove, cured for 2 hours at 400° F. and aged at 500° F. The results of tests at room temperature are shown in Table 2.

TABLE 2

| Ageing time (hrs.) | Flexural strength (p.s.i.) | Flexural modulus (p.s.i.) | Deformation (in./in. by $10^4$) |
|---|---|---|---|
| None | 16,600 | 432,000 | 1,000 |
| 100 | 10,900 | 471,000 | 600 |
| 200 | 12,200 | 486,000 | 600 |
| 300 | 14,400 | 517,000 | 700 |

The gel time (usually a range of times) is determined by heating a sample in a tube in an oil bath at the desired temperature until a rod immersed in the sample can no longer be withdrawn. This is done on samples of composition G containing 0.25% by weight of potassium acetate and on other samples containing 0.50% by weight of tris(dimethylaminomethyl)phenol. The latter compound is available commercially under the designation DMP30 from Rohm and Haas Company. Results on several such catalyzed compositions at a range of temperatures are shown in Table 3.

TABLE 3

| Composition | Cure temp. (° C.) | Gel time (min.) |
|---|---|---|
| G+KAOc | 121 | 50–60 |
| G+KAOc | 149 | 20–24 |
| G+KAOc | 177 | 8–10 |
| G+DMP30 | 94 | 40 |
| G+DMP30 | 104 | 15–20 |
| G+DMP30 | 127 | 5–8 |
| G+DMP30 | 160 | 1–2 |

What is claimed is:

1. A latently curable resin composition comprising in combination in substantially stoichiometrically reactive proportions a polyepoxide having more than one oxirane group per molecule and an allylic polyphenolic novolak substantially free from methylol groups represented by the structure

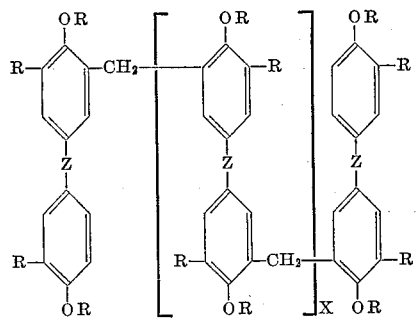

wherein Z is a divalent linking group selected from the group consisting of

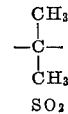

and

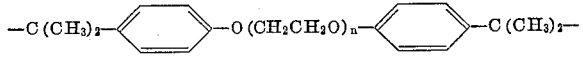

$n$ is an averaged number from 1 to 13, X is an averaged number from about 2 to about 5, each R is a member of the group consisting of hydrogen and allyl selected so that, at least once in each molecule, of the two R groups connected to a given cyclic nucleus directly and through oxygen one is hydrogen and the other is allyl.

2. A latent-curing resin composition according to claim 1 wherein the oxygen-attached allyl groups having unoccupied ortho-positions and the glycidyl groups are in substantially 1:1 stoichiometric relation.

3. A latent-curing resin composition consisting essentially of substantially stoichiometric equivalents based on allyl and glycidyl ether groups, respectively, of
 (1) a polyallyl ether of a novolak free from methylol groups, of a monohydric phenol represented by the structure

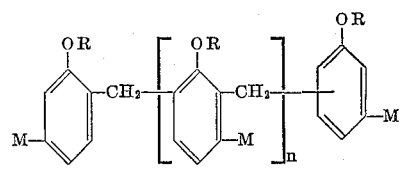

wherein R is allyl, $n$ is from about 2 to about 5 and M is hydrogen, allyl or saturated alkoxy; and
 (2) polyglycidyl ether of polyhydric phenol.

4. A latently curable resin composition comprising in combination in substantially stoichiometrically reactive proportions a polyglycidyl ether of polyhydric phenol having more than one oxirane group per molecule and a polyallyl ether of polyhydric phenol represented by the structure of claim 1 in which at least the majority of the R groups attached directly to cyclic nuclei are hydrogen and substantially all the R groups attached to oxygen are allyl groups.

5. A latent-curing resin composition according to claim 4 wherein at least nine out of every ten allyl groups are attached to oxygen.

6. A latently curable resin composition according to claim 1 wherein the polyepoxide is polyglycidyl ether of polyhydric phenol and R groups in the polyphenolic novolak attached to oxygen are hydrogen.

7. A latently curable resin composition according to claim 1 wherein the polyepoxide is polyglycidyl ether of polyhydric phenol and on the average at least nine out of ten R groups attached to carbon in the allylic polyphenolic novolak are allyl.

8. A latently curable composition according to claim 7 wherein the allylic polyphenolic novolak is substantially free from allylic ether groups.

9. A composition of matter, being a novolak of a bisphenol, represented by the formula

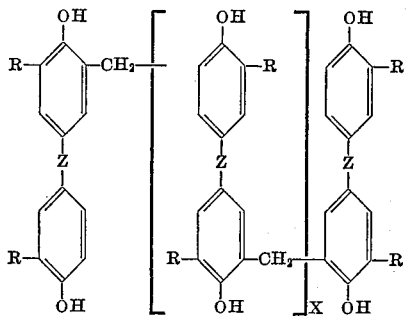

wherein Z is a divalent linking group selected from the group consisting of

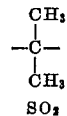

and

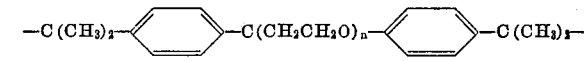

$n$ is an averaged number from 1 to 13, X is an averaged number from about 2 to about 5, and each R group is a member of the group consisting of hydrogen and allyl selected so that at least nine out of every ten R groups is allyl.

References Cited
UNITED STATES PATENTS
2,910,455   10/1959   Christenson _____ 260—831
3,024,285   3/1962   Bruin _____ 260—831

MURRAY TILLMAN, *Primary Examiner.*

P. LIEBERMAN, *Assistant Examiner.*

UNITED STATES PATENT OFFICE
CERTIFICATE OF CORRECTION

Patent No. 3,329,737
July 4, 1967

Carl M. Smith

It is hereby certified that error appears in the above numbered patent requiring correction and that the said Letters Patent should read as corrected below.

Column 2, line 22, for "temperatures" read -- at temperatures --; line 57, for "pre-arranged" read -- pre-rearranged --; column 6, line 63, for "compoistions" read -- compositions --; column 9, line 34, for "S" read -- F --; column 14, lines 16 to 18, for the center portion of the formula reading $-C(CH_2CH_2O)_n-$ read $-O(CH_2CH_2O)_n-$ Signed and sealed this 25th day of June 1968.

(SEAL)
Attest:

Edward M. Fletcher, Jr.
Attesting Officer

EDWARD J. BRENNER
Commissioner of Patents